Patented Nov. 2, 1937

2,097,479

UNITED STATES PATENT OFFICE 2,097,479

REMOVING SKIN FROM FRUITS

Robert B. Taylor, near Knoxville, Tenn.

No Drawing. Application October 14, 1936, Serial No. 105,527

2 Claims. (Cl. 146—219)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

This invention relates to a process for the treatment of fruits, particularly the removal of the skin which, in many instances, such as in the case of peaches and pears, is an expensive operation and invariably results in damage to the fruits.

One of the objects of this invention is to provide a means for the removal of the skin from fruits, particularly those fruits which have a flesh readily susceptible to injury by paring, chemical or heat treatment, which may be used for this removal. Another object of this invention is to provide a means for removing the peeling of fruits which preserves the shape and quality of the fruits resulting therefrom. Still another object of this invention is to provide a means for the removal of the skin of fruits which leaves the fruit after the skin has been removed in a firm condition for further processing as required, and at the same time attainable with high speed mechanical operation.

I have discovered a process for preparing certain kinds of fruits for use as a comestible, or for preservation, by freezing the fruit so that at least the outer portion of the flesh is solidified, by defrosting such frozen fruits to the extent that only the skin is thawed out and by separating the skin of the fruit so partially defrosted.

One example for the operation of my process is given for the treatment of Elberta peaches. The fruits were washed to remove solid foreign matter and the washed fruits were immersed in a circulating bath of sodium chloride refrigerant, containing approximately 200 grams of NaCl per liter, maintained at 0 to 10° F. and thereby subjected to a quick freezing. The fruits were frozen to a depth of approximately ⅛ inch. The partially frozen fruits were removed from the refrigerant bath, rinsed to remove the adhering refrigerant and to defrost substantially only the skin of the fruit. The skins were removed from the slightly defrosted fruits by expressing the fruit from the skins. The substantially semi-circular cut to the pit of the skinned, partially frozen fruit was made and the pit removed. The fruit thus prepared was then processed in a conventional manner by packing in cans, preheating, sealing the cans, and pressure cooking.

It is evident that there are numerous factors which will influence conditions for the most satisfactory operation of my process, the actual limits of which cannot be established except by a detailed study of each set of raw materials and the intermediate and finished products involved.

Any fruit or vegetable may be treated by the process herein described and claimed, provided each unit of fruit has only a unitary outer covering and not a plurality of partially contiguous units, as is the case with berries which consist of a plurality of drupelets. My process is particularly advantageous for use in the handling and preparation of those fruits which, when fully ripened, such as peaches and pears, have a very soft flesh. In my process, it is possible to use fully ripened fruit which have developed a maximum flavor rather than to use fruit which is not fully ripened as is required for present purposes.

The fruits are sorted for processing in the usual manner, and washed to remove foreign matter. The selected and washed fruits may be frozen by the use of any gaseous, liquid or solid refrigerant which does not have any undesirable constituents or which may not be prohibited by law in connection with comestibles. It is preferable to use a quick freezing process in which a refrigerant, such as an aqueous solution of salt or sugar, or both, is used. The individual fruits must be frozen at least substantially for that part of the flesh which is frozen to remain rigid until the peeling operation is completed. The depth of freezing may range from ⅛ inch to complete freezing of the fruit. The partially frozen or frozen fruits are defrosted to the extent that substantially only the skin is thawed out. This is preferably done by a rinsing operation which not only defrosts the skin but rinses the adhering refrigerant from the skin, leaving the skin adhering very loosely to the body of the fruit.

The partially frozen or frozen fruits on which substantially the skin only has been defrosted are peeled by abrading manually or mechanically; by such means as rubbing, slipping, scraping, or expressing the fruit from the skin.

The partially frozen, peeled fruits may be partially cut and the pits or cores removed, or they may be halved, quartered or sliced with the pits or cores removed at a convenient point of the operation. The fruits so prepared are now ready for immediate consumption or for cooking for immediate consumption, as the case may be, or are ready for preservation for future use in a frozen condition, preferably in closed containers at atmospheres free of oxygen, preserved by conventional procedure and used in canning or preserving the respective fruits.

It will be seen, therefore, that this invention actually may be carried out by the modification of certain details without departing from its spirit or scope.

I claim:

1. Process of preparing fruits for use as a comestible, which comprises, quick freezing the fruit so that only the outer portion of the flesh is solidified, leaving the portion around the pit or core unfrozen; defrosting to the extent that substantially only the skin is thawed out; abrading the skin from the fruit so defrosted; and removing the pit or core.

2. Process of removing the skins from fruits, which comprises, quick freezing the fruit so that only the outer portion of the flesh is solidified, leaving the portion around the pit or core unfrozen; defrosting to the extent that substantially only the skin is thawed out; and abrading the skin from the fruit so defrosted.

ROBERT B. TAYLOR.